United States Patent
Hjelmquist

[15] 3,705,484
[45] Dec. 12, 1972

[54] LAWN-MOWERS WITH HORIZONTALLY ROTATING KNIVES

[72] Inventor: Stig Gunnar Hjelmquist, Box 6, S-57301 Tranas, 1, Sweden

[22] Filed: Oct. 19, 1971

[21] Appl. No.: 190,673

[30] Foreign Application Priority Data

Oct. 21, 1970   Sweden .............................. 14160/70

[52] U.S. Cl. ............................................... 56/320.2
[51] Int. Cl. ............................................. A01d 55/18
[58] Field of Search....56/320.2, 295, 255, 17.5, 17.4

[56] References Cited

UNITED STATES PATENTS

| | | | |
|---|---|---|---|
| 2,071,872 | 2/1937 | Cockburn | 56/13.4 |
| 2,675,661 | 4/1954 | Titzer | 56/17.2 |
| 2,708,334 | 5/1955 | Coners | 56/320.2 |
| 2,719,396 | 10/1955 | Morris et al. | 56/12.2 |
| 2,864,226 | 12/1958 | Bright | 56/13.4 |
| 3,540,198 | 11/1970 | Heth et al. | 56/295 |
| 3,646,740 | 3/1972 | Grimes | 56/320.2 |
| 3,648,445 | 3/1972 | Efflandt | 56/320.2 |

FOREIGN PATENTS OR APPLICATIONS 223,820   8/1959   Australia ............................. 56/13.4

*Primary Examiner*—Russell R. Kinsey
*Attorney*—Beveridge & De Grandi

[57] ABSTRACT

A lawn-mower with horizontally rotating knives has an ejection aperture formed in a casing enclosing the rotary knives. Screening means are arranged in the ejection aperture to prevent accidents. The knives of the lawn-mower function in the manner of fan blades so as to cause the uncut grass to stand on end and to lift the cut-off grass blades to a level above the path of the knives. The knife unit also includes another fan device which produces a flow of air directed towards the ejection aperture and carrying the cut-off grass outwards through this aperture. Further, screening means are disposed above the ejection aperture at a level with the path of motion of the knives, and the ejection of the grass has to take place through a portion of the aperture that lies above the screened portion of the ejection aperture.

3 Claims, 1 Drawing Figure

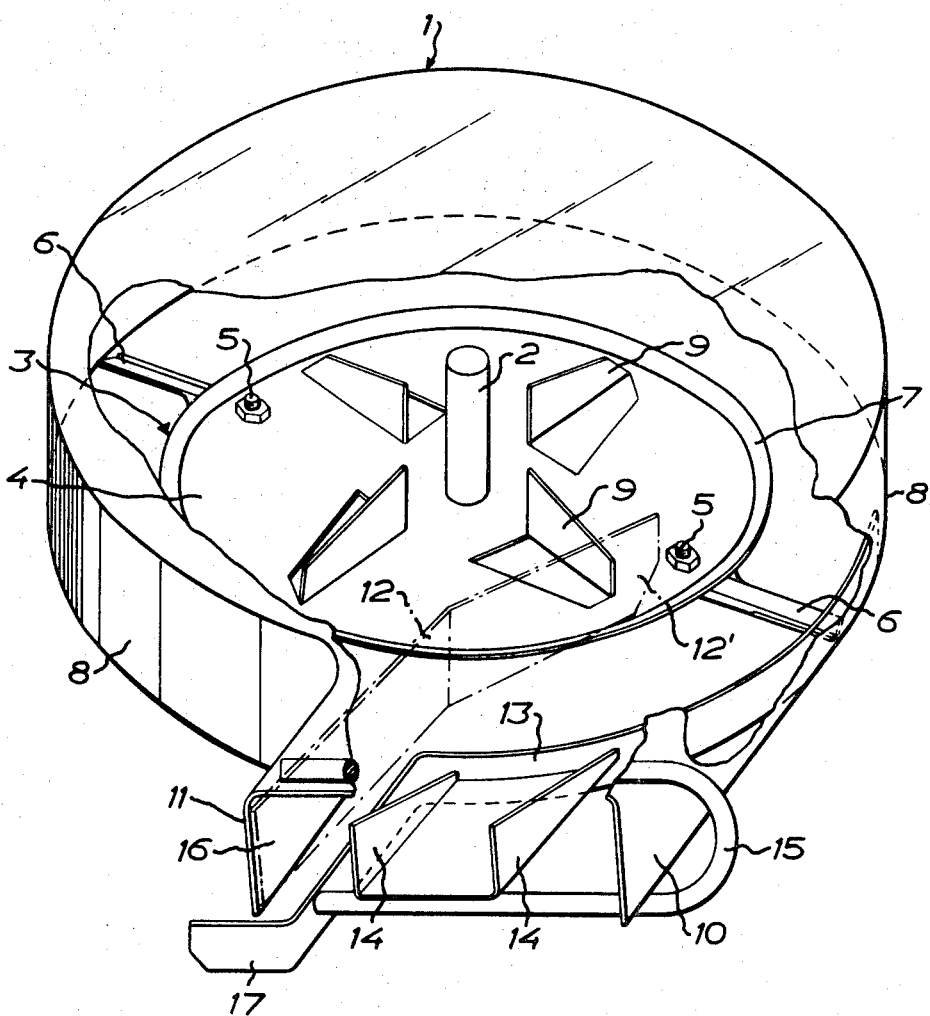

LAWN-MOWERS WITH HORIZONTALLY ROTATING KNIVES

This invention relates to an improvement in such lawn-mowers with horizontally rotating knives as have a casing enclosing the rotary knives and formed with an ejection aperture, a tangentially arranged discharge portion and screening means serving as a protective device against accidental contact and as a guard against the ejection of hard solid objects.

For safety reasons, conventional lawn-mowers of this type are provided with a casing which encloses the rotating knives and is intended to prevent the operator from coming in accidental contact with and being injured by the knives and the ejection of stones and other solid objects which the knives encounter as the lawn-mower is propelled over the lawn. The casing which is closely spaced from the ground entails, however, also the disadvantage that the cut-off grass remains beneath the casing, that particularly long and moist grass will collect and be deposited in tufts giving the lawn an unpleasant appearance, and moreover, the grass may be compacted in the casing so that rotation of the knifes is prevented. In countries having less severe safety requirements lawn-mowers have been developed for ejection of the grass through an aperture in the casing.

The present invention has for its object to provide an arrangement which has the undeniable advantages that are associated with an ejection aperture for the cut grass and nevertheless satisfies very high safety requirements.

In the arrangement according to the present invention it is not only the design of the screening means and the ejection aperture that is decisive for the function but also the design of the knife assembly and the details immediately surrounding it.

The arrangement according to the present invention is substantially characterized in that the knives which in conventional manner are adjustably mounted to a disk connected to a drive shaft, are set in an oblique position similar to fan blades so that upon rotation said knives will produce an upwardly directed flow of air which causes the grass to stand on end and which lifts the cut grass to a level above the path of movement of the knives, that the disk carrying the knives has fan blades or like means which are adapted to produce, in the space above the plane of rotation in which the knives move, a flow of air directed towards the ejection aperture which opens tangentially with respect to the path of the knives, that the ejection aperture at a level with the path of movement of the knives is screened by means of a bar or like means which in the direction of said path extends over the greater part of the ejection aperture, said bar merging beyond said part of the aperture in a portion projecting tangentially through the ejection aperture, transverse screening means being disposed at the outer end of said tangentially projecting portion which is spaced from the mouth of the ejection aperture, and that a protective device against accidental contact is so arranged, in the part of the ejection aperture which is situated above the screening means positioned at a level with the path of movement of the knives, as to extend preferably in the ejecting direction.

The heavy straight, horizontally rotating knife blades of a conventional lawn-mower of the type herein concerned have a very large living force. In the arrangement according to the present invention, the knife blades have been replaced by a disk which operates as a fan and carries two adjustable knives. The knives are placed in oblique position and upon rotation therefore produce an upwardly directed air flow which causes the grass to stand on end and which lifts the cut-off grass upwards. Due to the fan action which is simultaneously provided by the disk a vigorous air flow is produced within the casing at a level above the plane in which the knives rotate. It should be mentioned that the suction realized with the aid of the oblique knives and the fan disk is not so large that heavy objects such as stones can be lifted up and ejected. An advantage gained by the described design of the knife assembly is that the risk of the mower being damaged, as a rule a bent motor shaft, is highly reduced in that the knifes will move aside when they encounter solid objects.

In all of the prior art lawn-mowers having an ejection aperture the cut-off grass is thrown out of the casing in a path contained in or close to the plane of rotation in which the knifes move. This makes it impossible in practice to separate stones and heavy solid objects effectively. However, such effective separation is realized by the construction suggested in accordance with the present invention, in which the cut-off grass before ejection is lifted up to a level above the plane of rotation of the knives, while stones and heavy objects either will remain lying on the ground or, if encountered by the knife, will be thrown about within the casing. If a knife should encounter a stone in such a way as to throw it towards the ejection aperture the stone will be caught by the screen which is at a level with the plane of rotation of the knives or by the transverse screening means spaced from the mouth of the ejection aperture.

The ejection aperture proper which is at a level above the plane of rotation of the knives is altogether free from details preventing the grass to pass through said aperture. To prevent that the operator's hands or feet might contact the knifes, inwardly tapering screens are provided in said aperture and so placed that there is no risk whatsoever of grass collecting thereon.

One embodiment of the invention will be more fully described hereinbelow with reference to the accompanying drawing which in a perspective view shows a partially cut open portion of a lawn-mower according to the invention.

In the drawing, less relevant details such as wheels, drive motor and handles are not shown. The casing carried by the wheels is designated 1 and encloses the knife assembly which is generally designated 3 and is supported by the motor shaft 2. The knife assembly includes a circular disk 4 at the periphery of which two knives 6 are mounted. The knives are in a known manner adjustably arranged on pins 5. In the embodiment illustrated the knives are somewhat obliquely positioned similar to propeller blades and consist of relatively thin metal profile members. The disk 4 has such a diameter that a space will be left for the knifes between the preferably bent up edge 7 of the disk 4 and the substantially vertical wall 8 of the casing 1. A number of fan blade means 9 are disposed on the upwardly facing side of the disk 4. A discharge portion 10 which is open downwardly extends tangentially to the casing 1. That side 11 of said discharge portion which extends transversely to the wall of the casing may be extended inwardly with the aid of a vane 12. The inner slightly curved end 12' of the vane 12 should extend tangentially inwards to an axial plane passing through the periphery of the rotary disk 4. The vane 12 has a vertical dimension such that the knifes 6 can pass beneath it. By giving the portion of the casing that surrounds the ejection aperture a suitable configuration in point of flow the vane 12 may, however, be dispensed with.

The provision of the blade means 9 on the disk 4 in combination with the oblique or inclined knifes 6 and the tangential discharge portion and possibly the vane 12 will produce upon rotation of the disk and the knives an upwardly directed suction which tends to make the grass blades stand on end and lift the cut-off grass blades, and also a vigorous air movement which will throw the cut-off grass out of the casing.

One might think it possible to provide the discharge portion 10 with an optional type of grid to prevent the ejection of heavy objects, said grid also serving as a protective device against accidental contact. However, experience has shown that conventional grids and like means are not useful as they are very rapidly clogged by cut-off grass blades. This most probably is due to the different velocities of the grass blades depending upon what part of the discharge portion 10 they are ejected from. The blades ejected close to the periphery of the casing and along a tangent have the highest velocity and run a relatively small risk of getting stuck and collecting, whereas the blades ejected along the opposite edge of the ejection aperture have a lower velocity and therefore easily get stuck. In the first part of the opening the risk of clogging is thus smaller. In the lawn-mower of the present invention this problem has been solved by providing that part of the ejection aperture where the velocity is greater with a transverse bar 13 which is an extension of the lower marginal portion of the wall 8 of the casing, runs at a level with the rotary path of the knives and is adapted to prevent heavy solid objects to be thrown straight outwards by the knives, and also with contact protection guard means arranged outside said bar 13 and having the form of two inwardly tapering metal plates 14 which are carried by a U bar 15 secured to the outwardly projecting discharge portion 10. Neither the bar 13 nor the U bar 15 having the metal plates 14, however, traverses the entire opening in the discharge portion 10. Instead, the transverse bar 13 is bent abruptly outwardly short of the opposite wall and, as will appear from the drawing, connected with the U bar 15 so that a free space 16 remains adjacent that edge of the opening where the velocity is lower. In the free space 16 which contains no structure that would prevent the ejection of the grass and that would be capable to catch it, no collection of grass can take place. The risk that the ejection aperture will be clogged is thus eliminated. To prevent the ejection of heavy solid objects through the space 16 a bent end portion 17 of the bar 13 extends perpendicular thereto some distance from the mouth of the discharge portion across the assumed path of a heavy object ejected through said free space 16. The end or screening portion 17 is spaced such a distance from the mouth that the collection of grass thereon is of no significance for the function, but lies sufficiently close to catch, or decelerate the movement of, ejected stones and like solid objects. Besides, the end portion 17 will form together with the metal plates 14 an efficient protective device against accidental contact inasmuch as the free distances between said parts are too small to allow for instance the operator's hand to penetrate past them into the working range of the knives.

The invention is not limited to the embodiment described above and illustrated in the drawing but can be modified in several ways within the scope of the appended claims.

What I claim and desire to secure by Letters Patent is:

1. A lawn-mower with horizontally rotating knives of the type having a casing enclosing the rotary knives and formed with an ejection aperture, a tangentially arranged discharge portion and screening means serving as a protective device against accidental contact and as a guard against the ejection of hard solid objects, wherein the knives which in conventional manner are adjustably mounted to a disk connected to a drive shaft, are set in an oblique position similar to fan blades so that upon rotation said knives will produce an upwardly directed flow of air which causes the grass to stand on end and which lifts the cut grass to a level above the path of movement of the knives, the disk carrying the knives has fan blades or like means which are adapted to produce, in the space above the plane of rotation in which the knives move, a flow of air directed towards the ejection aperture which opens tangentially with respect to the path of the knives, the ejection aperture at the level of the path of movement of the knives is screened by means of a bar or like means secured to said casing which in the direction of said path extends over the greater part of the ejection aperture, said bar merging beyond said part of the aperture in a portion projecting tangentially through the ejection aperture, transverse screening means being disposed at the outer end of said tangentially projecting portion which is spaced from the mouth of the discharge portion, and a protective device supported on said discharge portion to prevent accidental contact with said rotating knives is so arranged, in the part of the ejection aperture which is situated above the screening means positioned at a level with the path of movement of the knives, as to extend preferably in the ejecting direction.

2. A lawn-mower as defined in claim 1, wherein the protective device arranged in the ejection aperture is at least one inwardly tapering metal plate extending in the direction of ejection and so arranged that its one free edge is spaced from the opposite boundary wall of the ejection aperture.

3. A lawn-mower as defined in claim 1, wherein the ejection aperture is defined by said discharge portion portion of the casing which portion like the casing proper is entirely open downwards.

* * * * *